United States Patent
Schleicher et al.

(10) Patent No.: US 6,631,945 B2
(45) Date of Patent: Oct. 14, 2003

(54) OPENABLE MOTOR VEHICLE ROOF

(75) Inventors: Bernd Schleicher, München (DE); Michael Hanke, München (DE); Philipp Laux, München (DE); Martin Pollak, Germering (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/025,828

(22) Filed: Dec. 26, 2001

(65) Prior Publication Data
US 2002/0093226 A1 Jul. 18, 2002

(30) Foreign Application Priority Data
Dec. 23, 2000 (DE) .......................... 100 65 947

(51) Int. Cl.$^7$ ................ B60J 7/05; B60J 7/19
(52) U.S. Cl. ............... 296/221; 296/222; 296/223; 296/224
(58) Field of Search ................ 296/221, 222, 296/223, 224

(56) References Cited

U.S. PATENT DOCUMENTS 4,869,548 A * 9/1989 Nagata et al. ............ 296/221
5,632,523 A * 5/1997 Kelm ........................ 296/223
6,024,404 A * 2/2000 Stallfort et al. ........... 296/223

FOREIGN PATENT DOCUMENTS

| DE | 34 44 522 | 4/1986 |
| DE | 44 05 583 | 9/1994 |
| DE | 94 07 234 | 10/1994 |
| DE | 199 34 847 | 10/2000 |

* cited by examiner

Primary Examiner—Dennis H. Pedder
(74) Attorney, Agent, or Firm—Nixon Peabody LLP; David S. Safran

(57) ABSTRACT

An openable motor vehicle roof with at least one cover which selectively closes the roof opening by means of a raising and displacement mechanism (crank path, crank pin, drive carriage) and at least partially clears it by raising or lowering its rear edge and by displacement along a guide rail, with a locking element which locks an element connected to the cover with the guide rail in the closed position and the raised position. For reliable and low-wear interlocking of the cover mechanism in the closed and raised position, with a simple structure, it is provided that, in a sliding and lifting roof with a cover which can be lowered and can be pushed under the fixed vehicle roof, there is a locking element on the locking lever which is pivotally located on a component (cover carrier) which is connected to the cover being disengaged from the guide rail toward the end of the lowering motion of the cover which precedes the displacement motion.

20 Claims, 4 Drawing Sheets

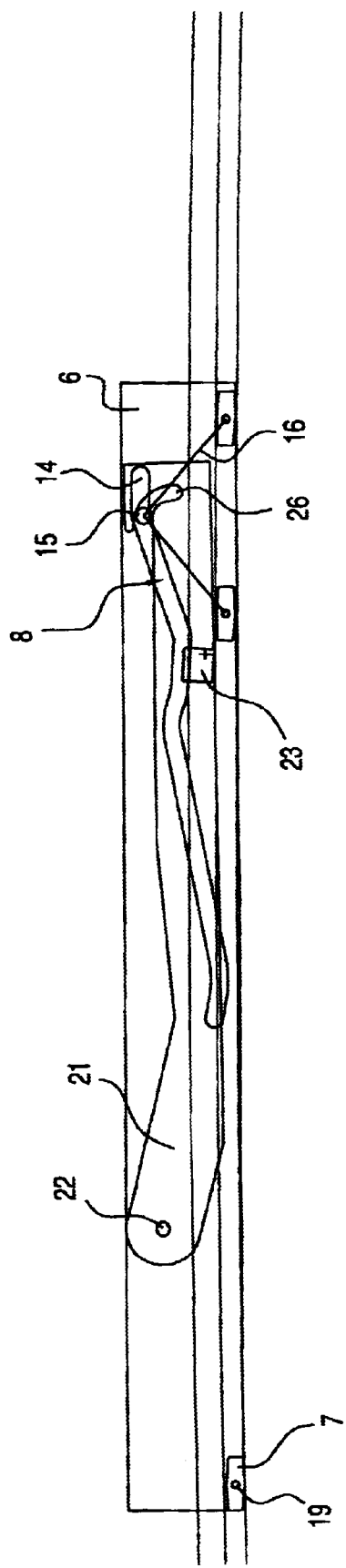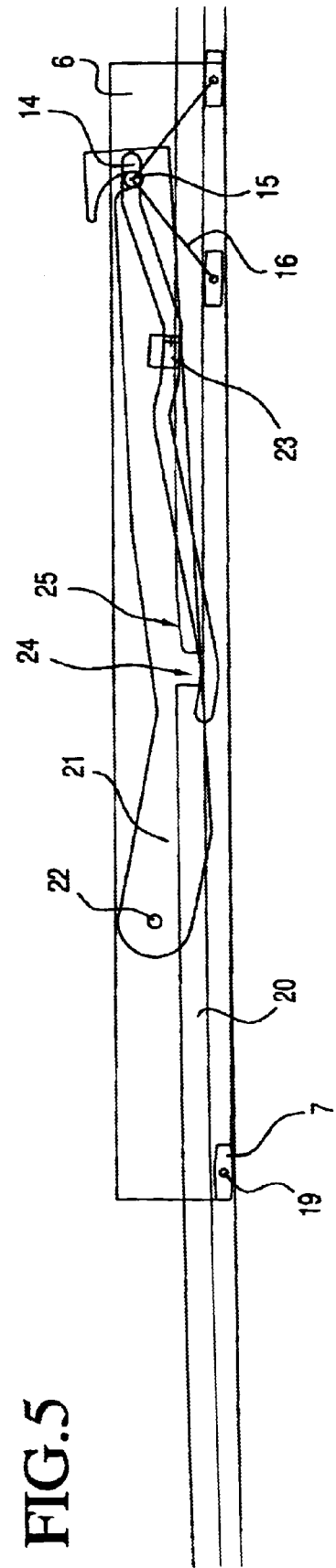

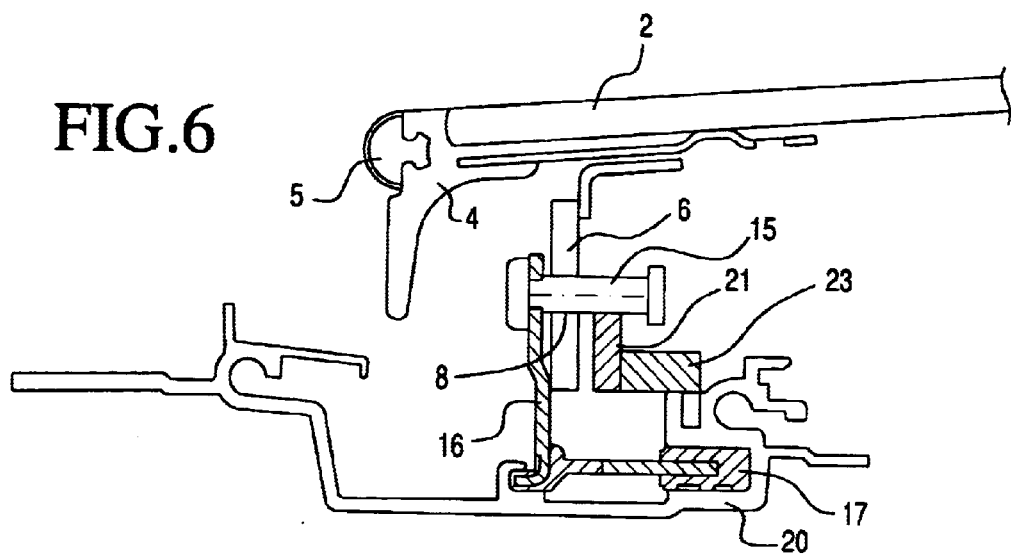
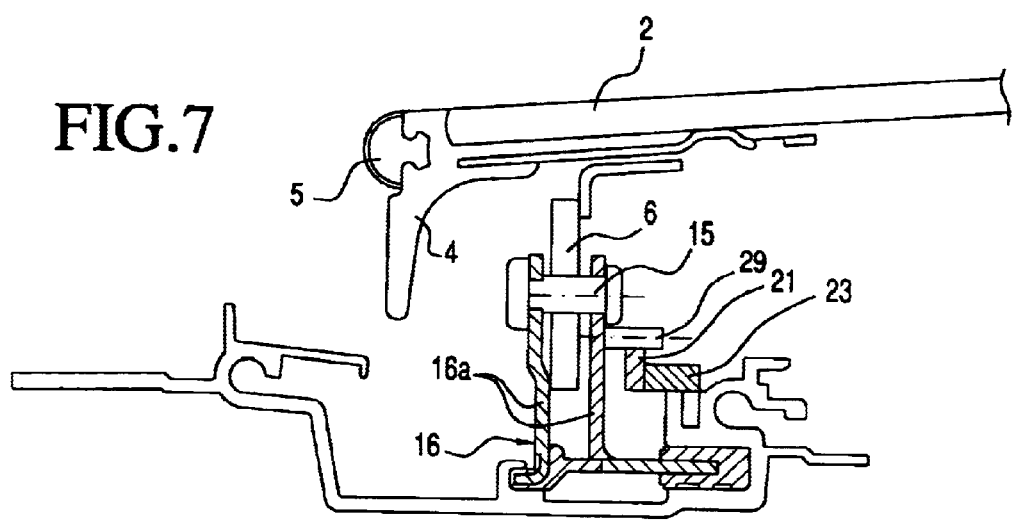
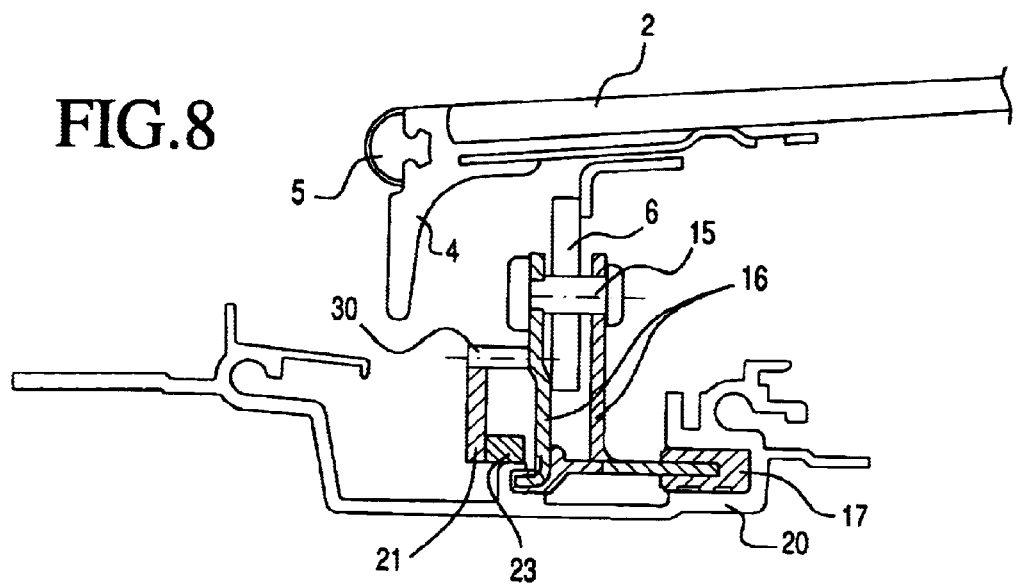

OPENABLE MOTOR VEHICLE ROOF

BACKGROUND OF THE INVENTION

1. Field of the Invention

The invention relates to an openable motor vehicle roof with at least one cover which selectively closes the roof opening by means of a raising and displacement mechanism (crank path, crank pin, drive carriage) and at least partially clears it by raising its lower edge or by displacement along one guide rail, with a locking element which locks the element connected to it in the closed position or the raised position with the guide rail and which is located on the locking lever which is pivotally located on the component which is connected to the cover.

2. Description of the Related Art

One such motor vehicle roof is generally known, see published German Patent Application DE 44 05 583 A1. This motor vehicle roof is made as a lifting and sliding roof which can be raised with its rear edge over the fixed motor vehicle roof and can be pushed to the rear. To actuate a locking element there is a lever which is additionally coupled to the carriage for the raising and displacement motion and which has on its bottom a catch projection for fitting into the recess of the guide rail and is raised by means of a cam slot when the carriage is displaced by a guide pin located on the carriage. The mechanism shown is not suited for actuating a sliding and lifting roof in which the cover is lowered with its rear edge and is pushed to the rear to under the fixed motor vehicle roof. Furthermore, an additional crank for actuating the locking element also means additional cost.

In the motor vehicle roof known from published German Patent Application DE 34 44 522 A1, there is a catch hook which is elastically preloaded in the engagement position with the guide rail on the front sliding block of a sliding and lifting roof mechanism which, when the cover is lowered before sliding under the solid motor vehicle roof, is disengaged from the cover or the part which is connected to it. In one such catch hook, complex calibration relative to the cover or the part connected to it is necessary to ensure perfect operation.

SUMMARY OF THE INVENTION

The object of the invention is to devise an openable motor vehicle roof in which simple, reliable and low-wear locking and unlocking of the displacement mechanism is enabled.

Reliable sustained forcing of the locking element is achieved by the arrangement of the locking element on a locking lever which is pivotally connected to the cover or a component connected to it, such as a cover carrier. An additional crank/guide pin arrangement for actuating the locking lever is not necessary, as in the initially mentioned German Patent Application DE 44 05 583 A1. Moreover, the tolerances to be observed are reduced by the direct coupling of the locking lever to the cover or a component (cover carrier) connected to it.

Here, the locking lever is advantageously pre-tensioned in the conventional manner in the direction to the engagement position of the locking element, by which especially when driving on uneven ground, on the one hand, reliable engagement of the locking element is ensured, and on the other, rattling noise is prevented.

The driver means is preferably formed by a cam slot which is bent downward and which is opened to the front. The raising and displacement mechanism preferably has a guide pin which is supported in the drive carriage in the conventional manner.

An arrangement is especially preferred in which the guide pin in interaction with a guide path which is connected to the cover controls both the movements of the cover and also the movements of the locking lever.

According to one alternative embodiment, it is provided that, on the raising and displacement mechanism, preferably on its drive carriage, there is an additional control journal for actuating the locking lever. By means of such an additional control journal located underneath the actual crank pin, the structural height of the mechanism can be reduced.

In the conventional manner, the guide rail preferably has a recess into which the locking element fits from overhead. Preferably, this recess is adjoined to the rear by an ascending ramp for guiding the locking element. The ramp facilitates the locking element's fitting clearly into the closed position when the cover is pushed back.

The locking lever in the displacement direction of the cover extends viewed over the entire path of the raising and displacement mechanism which is required for producing the pivoting motions of the cover. This means that almost the entire length of the guide path responsible for the pivoting movements of the cover is covered by the locking lever.

In order to create an especially favorable application of force for locking and unlocking, it is preferably provided that the locking element in the closed position of the cover is located roughly vertically under the engagement position of the raising and displacement mechanism, i.e. roughly underneath the crank pin.

Embodiments of the invention are described below with reference to the accompanying drawings.

BRIEF DESCRIPTION OF THE DRAWINGS

FIG. 4 shows a view as shown in FIG. 1 for a cover that has been lowered at its rear edge, FIG. 5 shows a view as shown in FIG. 1 for a cover pushed to the rear, FIGS. 6–8 show, in a cross sections taken along line A—A in FIG. 1, different versions of the arrangement of the locking lever and of the locking element.

DETAILED DESCRIPTION OF THE INVENTION

Figure 9:
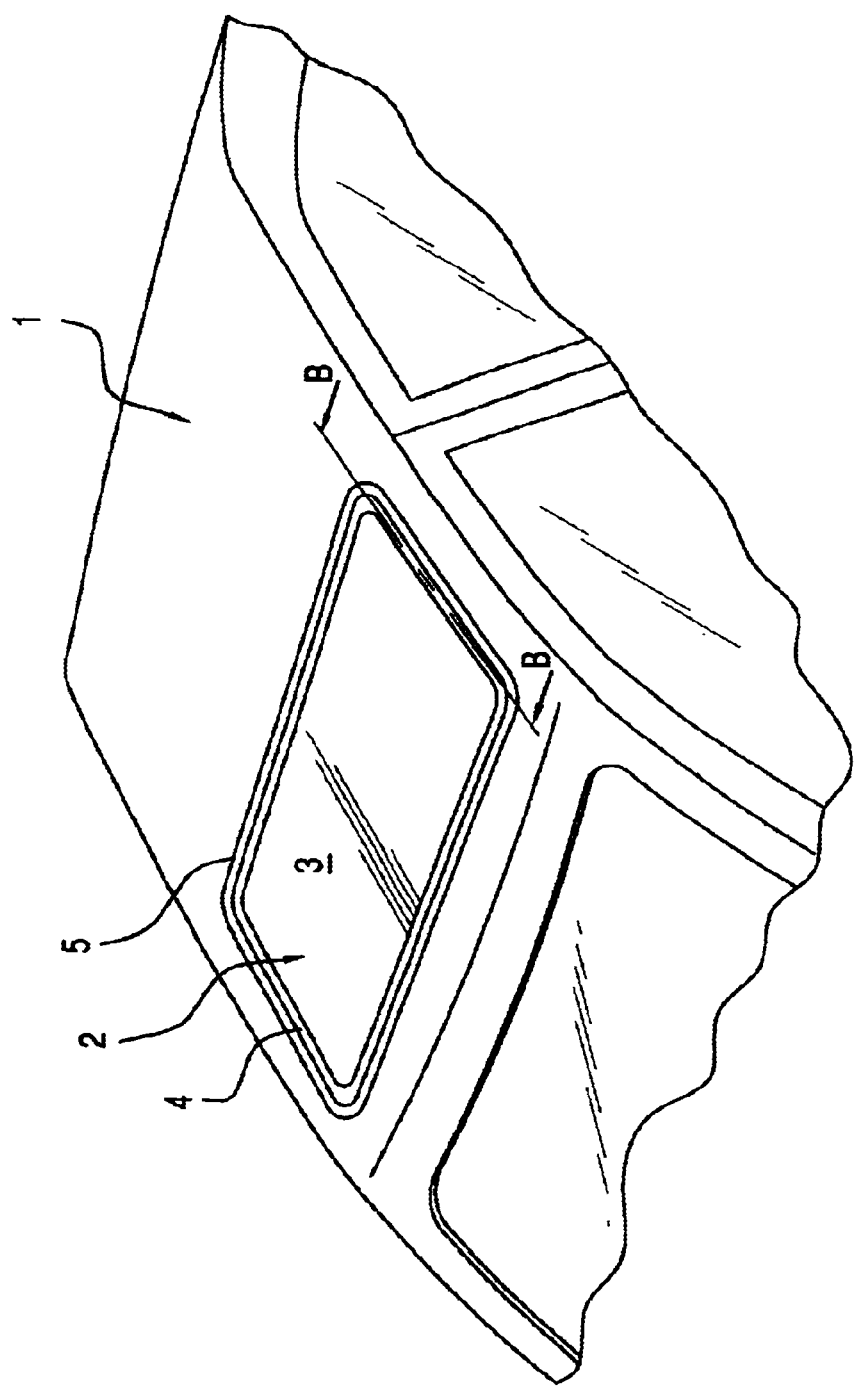
FIG. 9 is a schematic perspective plan view of a motor vehicle roof.

The motor vehicle roof 1 shown in FIG. 9 has a cover 2 by means of which a roof opening 3 can be selectively closed or at least partially cleared. The cover 2 is preferably made in the form of a transparent pane which is surrounded by a cover frame 4, preferably of plastic, and a peripheral cover seal 5 which is attached to the cover frame 4.

On either side of the cover 2, on its bottom there is a cover carrier 6, as shown in 6 to 8. The views in FIGS. 1 to 5 are in this respect side views of a lengthwise section taken along line B—B in FIG. 9.

The cover carrier 6 is pivotally supported in the guide rail 20 by means of a front sliding element 7. In doing so, support on the sliding element takes place either by means of a pivoting axis 19 or the sliding element 7 is made crowned on the top and bottom so that it can concomitantly make the pivoting motions of the cover carrier 6. In this case the pivoting axis 19 is a component of the sliding element 7. The cover carrier 6 in the rear area has a guide path 8 which is composed of different guide path sections 9, 10, 11, 12, 13 and 14. The first section 9 which is lowest relative to the other sections and extends almost horizontally is adjoined by a second section 10 which rises linearly to the rear. This is followed by a saddle-shaped third section 11 which controls the dipping motion of the rear edge of the cover during a pivoting motion. The latter is adjoined to the rear by a fourth section 12 which is made essentially horizontal and defines the zero position of the cover 2, in which it is located flush with the surrounding fixed roof skin. This is followed by a linearly rising fifth section 13 which follows to the rear and an essentially horizontal section 14 which is highest.

A guide pin 15 which is located on the drive carriage 16 can be moved in the guide path 8 with its sections 9 to 14. The drive carriage 16 which is shown in FIGS. 1–5 only schematically in the form of a triangle is supported on its front end on either side in the guide rail 20 via the sliding element 17 and on its back end by the sliding element 18 in the same way.

Figure 1:
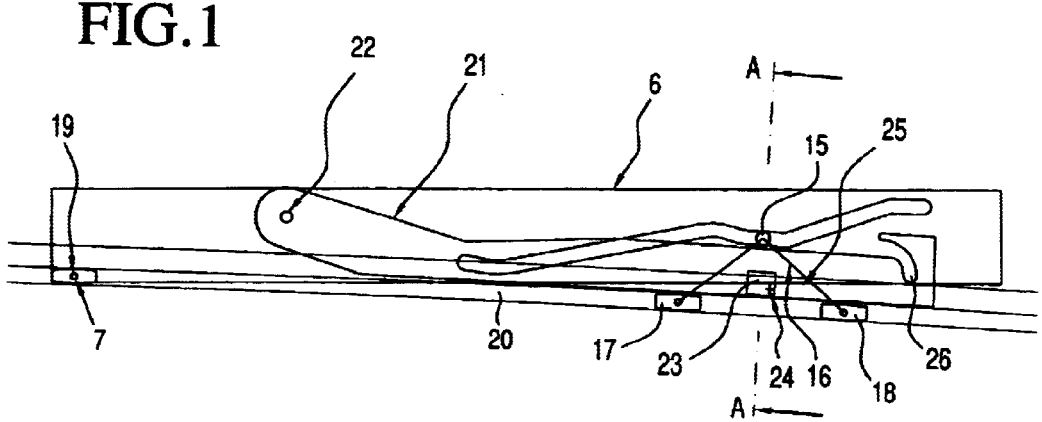
FIG. 1 shows a schematic side view of the raising and displacement mechanism in the closed position of the cover.

In the front area of the cover carrier 6, preferably roughly after one fifth to one fourth of its length a locking lever 21 is pivotally connected to the pivoting axis 22. The locking lever 21 which runs from its pivoting axis 22 obliquely to the rear and down has after roughly one fourth to one third of its length a bend in the direction to the horizontal and extends over almost the entire length of the guide path 8 with its rear part which is roughly parallel to the guide rail 20 in the closed position of the cover as shown in FIG. 1 and which adjoins to the bend. On the back top end the locking lever 21 has a cam slot 26 which is open forward and which is subsequently bent downward.

Figure 3:
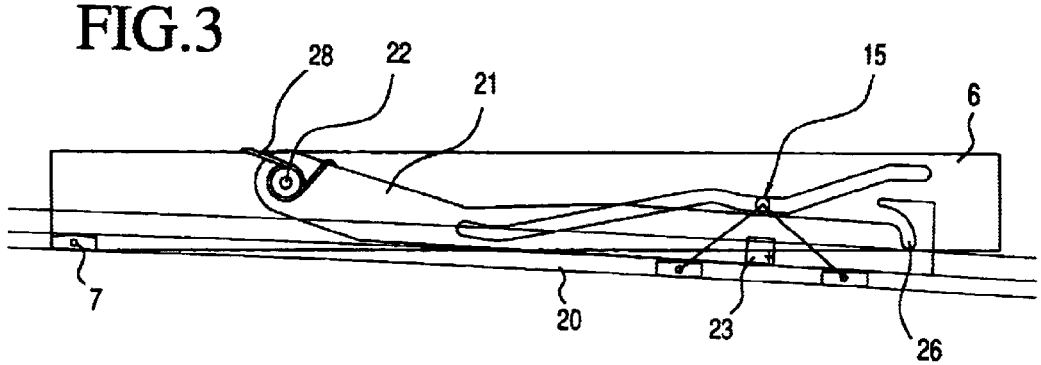
FIG. 3 shows a view similar to FIG. 1 in which in addition a spring element for actuating the locking lever is shown.

The locking lever 21 is preferably loaded elastically downward relative to the cover carrier 6 by means of the spring element 28 shown in FIG. 3 so that the locking element 23 which is located in the rear third of the locking lever laterally underneath on it is pressed into the recess 24 on the guide rail 20. The recess 24 in the guide rail 20 is adjoined to the rear by a ramp 25 which rises to the rear and along which the locking element 23 slides after emerging from the recess 24, i.e. in its movement phase between FIGS. 4 and 5. With reversed motion, i.e. out of the position shown in FIG. 5 into the position shown in FIG. 4, the locking element 23 as a result of the ramp 25 which is lowered forward with its front edge strikes the front edge of the recess 24 and is thus clearly pressed into the recess 24.

The drive carriage 16 and the cover carrier 6 with the guide path 8 can assume different configurations, as is illustrated in FIGS. 6 to 8. Thus, in the embodiment shown in FIG. 6 the drive carriage 16 from only the outside fits with the guide pin 15 into the guide path 8 on the cover carrier 6, while the locking lever 21 is located with the locking element 23 on the inside of the cover carrier 6. The crank 15 is made elongated to the inside and its free end is bordered by a collar with an expanded diameter. The end of the crank pin 15, which is elongated to the inside, is used to actuate the locking lever 21. For this purpose, during the pivoting motions of the cover 2, pin 15 adjoins the top surface of locking lever 21, and on the end of the pivoting motion which precedes the displacement of the cover 2, engages the cam slot 26.

The embodiment as shown in FIG. 7 differs from the latter in that the drive carriage 16 has two cheeks 16a which extend on both sides of the cover carrier 6 and thus ensure more stable support of the guide pin 15 without tilting. Furthermore, in contrast to FIG. 6, in which the guide pin 15 is elongated to the inside, the guide pin 15 in FIG. 7 is made shortened so that it only establishes the connection between the two cheeks of the drive carriage 16 and the guide path 8 of the cover carrier 6. For engagement with the cam slot 26 of the locking lever 21, in the version as shown in FIG. 7, there is an additional control journal 29 on the control carriage 16. This control journal 29 is lower than the guide pin 15 so that the locking lever 21 can be made lower relative to the height of the motor vehicle roof than is shown in FIGS. 1–5.

Finally, FIG. 8 shows another version in which, in contrast to FIG. 7, instead of the separate control journal 29, a control journal 30 is located on the outside of the drive carriage 16, which likewise has two cheeks, and which controls the pivoting motion of the locking lever 21, which is likewise located outside in this case, by adjoining its top edge and fitting into the cam slot 26.

The operation of the motor vehicle roof according to the invention, proceeding from the closed position in FIG. 1, is briefly described below, in which the guide pin 15 is located in the fourth section 12 of the guide path 8. The guide pin 15 furthermore adjoins the top of the locking lever 21 which is pressed down additionally by the spring 28 and thus is kept engaged with the recess 24 on the guide rail 20.

Figure 2:
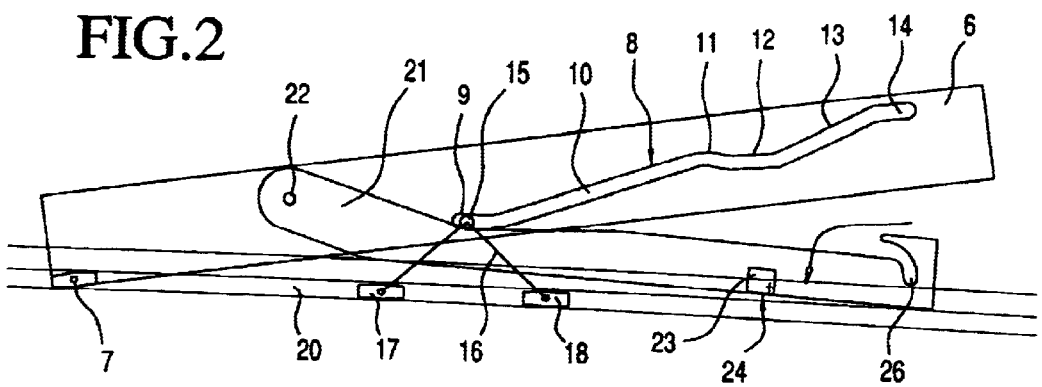
FIG. 2 shows a view according to FIG. 1 with the cover raised.

For raising the cover 2, the drive carriage 16 is moved out of the position shown in FIG. 1 into the position shown in FIG. 2, i.e., to the left in the drawing. In doing so, the guide pin 15 traverses, in succession, the sections 11, 10, and 9 of the guide path 8. During the entire movement, the guide pin 15 preferably slides on the top edge of the locking lever 21, being additionally pressed down by the spring element 28 so that the locking element 23 also remains engaged with the recess 24 during the raising motion. The cover 2 is moved again out of the raised position as shown in FIG. 2 into the closed position as shown in FIG. 3 in which the drive carriage 16 is moved by the same amount to the rear.

In order to lower the cover 2 at its rear edge and to move it to the rear to under the fixed motor vehicle roof 1, the drive carriage 16 is moved to the rear out of the position shown in FIGS. 1 to 3. In doing so, the guide pin 15, in succession, traverses the fifth section 13 and the sixth section 14 of the guide path 8. In the transition from the fifth section 13 into the horizontal sixth section 14, the guide pin 15, as shown in FIG. 4, enters the cam slot 26 of the locking lever 21. As the drive carriage 16 continues to move to the rear, the locking lever 21 is raised by the guide pin 15 striking the upper bent flank of the cam slot 26 so that the locking element 23 is raised upward out of the recess 24.

With subsequent displacement to the rear to under the fixed motor vehicle roof 1, the locking element 23 slides to the rear on the guide rail 20. Here, the guide pin 15 both engages the sixth section 14 of the guide path 8 and also the cam slot 26 on the locking lever 21. In the version shown in FIG. 7 or 8, alternatively to the guide pin 15, the control journal 29 and 30 engages the cam slot 26.

If the cover 2 is moved forward again out of the open position, pushed to the rear as shown in FIG. 5, the locking element 23 runs somewhat down onto the forwardly tilted ramp 25 on the guide rail 20 before reaching the recess 24, and thus, with its front edge, strikes the front edge of the recess 24 so that it is not possible to overrun this recess 24. The locking element 23 is thus reliably lowered into the recess 24.

By means of the described raising and displacement mechanism, which at the same time forcibly triggers the locking element 23, a reliable mechanism is devised which does not require any adjustment or maintenance and operates almost without wear over a long time interval. Even though the embodiments described relate to the mechanism for a sliding and lifting roof, a locking lever which can be actuated by the drive carriage of the raising and displacement mechanism of this invention can be used in modified form also for a spoiler roof or an externally guided sliding roof, as will be apparent to those skilled in the art. Thus, this invention should not be viewed as limited to the specific embodiments shown and described herein.

What is claimed is:

1. Openable motor vehicle roof comprising:
    at least one cover which selectively closes and at least partially clears a roof opening by means of a raising and displacement mechanism;
    a locking element which locks a component connected to the cover with a guide rail in a closed position or a raised position of the cover, the locking element being located on a locking lever which is pivotally located on the component which is connected to the cover;
    a disengagement element for disengaging the locking element from the guide rail toward an end of the lowering motion of the cover which precedes the displacement motion, said disengagement element being located on a drive carriage of the raising and displacement mechanism,
    wherein the at least one cover of the openable motor vehicle roof executes a lowering motion at its rear edge before executing a sliding displacement motion, and
    wherein the disengagement element comprises,
        a guide pin which is supported on the drive carriage and which controls both the movements of the cover and the movements of the locking lever in interaction with a guide path which is connected to the cover, and
        a cam slot which is curved downward in a rearward direction and which is open in a forward direction for receiving said guide pin.

2. Openable motor vehicle roof as claimed in claim 1, wherein the locking lever is pre-tensioned in a direction toward an engagement position of the locking element by means of a spring element.

3. Openable motor vehicle roof as claimed in claim 1, wherein the drive carriage of the raising and displacement mechanism extends on both sides of the component which is connected to the cover.

4. Openable motor vehicle roof as claimed in claim 1, wherein the guide rail has a recess into which the locking element fits from overhead.

5. Openable motor vehicle roof as claimed in claim 3, wherein the guide rail has a ramp which rises to the rear and which adjoins the recess for guiding the locking element.

6. Openable motor vehicle roof comprising:
    at least one cover which selectively closes and at least partially clears a roof opening by means of a raising and displacement mechanism;;
    a locking element which locks a component connected to the cover with a guide rail in a closed position or a raised position of the cover, the locking element being located on a locking lever which is pivotally located on the component which is connected to the cover;
    a disengagement element for disengaging the locking element from the guide rail toward an end of the lowering motion of the cover which precedes the displacement motion, said disengagement element being located on a drive carriage of the raising and displacement mechanism,
    wherein the at least one cover of the openable motor vehicle roof executes a lowering motion at its rear edge before executing a sliding displacement motion, and
    wherein the disengagement element further comprises,
        a control journal on the drive carriage of the raising and displacement mechanism,
        a displacement mechanism for actuating the locking lever, and
        a cam slot which is curved downward in a rearward direction and which is open in a forward direction for receiving said control journal.

7. Openable motor vehicle roof as claimed in claim 6, wherein the locking lever is pre-tensioned in a direction toward an engagement position of the locking element by means of a spring element.

8. Openable motor vehicle roof as claimed in claim 6, wherein the drive carriage of the raising and displacement mechanism extends on both sides of the component which is connected to the cover.

9. Openable motor vehicle roof as claimed in claim 6, wherein the guide rail has a recess into which the locking element fits from overhead.

10. Openable motor vehicle roof as claimed in claim 8, wherein the guide rail has a ramp which rises to the rear and which adjoins the recess for guiding the locking element.

11. Openable motor vehicle roof comprising:
    at least one cover which selectively closes and at least partially clears a roof opening by means of a raising and displacement mechanism;
    a locking element which locks a component connected to the cover with a guide rail in a closed position or a raised position of the cover, the locking element being located on a locking lever which is pivotally located on the component which is connected to the cover;
    a disengagement element for disengaging the locking element from the guide rail toward an end of the lowering motion of the cover which precedes the displacement motion, said disengagement element being located on a drive carriage of the raising and displacement mechanism,
    wherein the at least one cover of the openable motor vehicle roof executes a lowering motion at its rear edge before executing a sliding displacement motion, and
    wherein the locking lever, in a direction of the displacement motion of the cover, extends over the entire path of the raising and displacement mechanism which is required for producing pivoting motions of the cover.

12. Openable motor vehicle roof comprising:
    at least one cover which selectively closes and at least partially clears a roof opening by means of a raising and displacement mechanism;
    a locking element which locks a component connected to the cover with a guide rail in a closed position or a raised position of the cover, the locking element being located on a locking lever which is pivotally located on the component which is connected to the cover;
    a disengagement element for disengaging the locking element from the guide rail toward an end of the lowering motion of the cover which precedes the displacement motion, said disengagement element being located on a drive carriage of the raising and displacement mechanism, wherein the at least one cover of the openable motor vehicle roof executes a lowering motion at its rear edge before executing a sliding displacement motion, and wherein the displacement mechanism comprises a guide pin which is displaceable in a guide slot, and wherein the locking element, in the closed position of the cover, is located roughly vertically under the guide pin of the raising and displacement mechanism.

13. Openable motor vehicle roof as claimed in claim 11, wherein the locking lever is pre-tensioned in a direction toward an engagement position of the locking element by means of a spring element.

14. Openable motor vehicle roof as claimed in claim 11, wherein the drive carriage of the raising and displacement mechanism extends on both sides of the component which is connected to the cover.

15. Openable motor vehicle roof as claimed in claim 11, wherein the guide rail has a recess into which the locking element fits from overhead.

16. Openable motor vehicle roof as claimed in claim 14, wherein the guide rail has a ramp which rises to the rear and which adjoins the recess for guiding the locking element.

17. Openable motor vehicle roof as claimed in claim 12, wherein the locking lever is pre-tensioned in a direction toward an engagement position of the locking element by means of a spring element.

18. Openable motor vehicle roof as claimed in claim 12, wherein the drive carriage of the raising and displacement mechanism extends on both sides of the component which is connected to the cover.

19. Openable motor vehicle roof as claimed in claim 12, wherein the guide rail has a recess into which the locking element fits from overhead.

20. Openable motor vehicle roof as claimed in claim 18, wherein the guide rail has a ramp which rises to the rear and which adjoins the recess for guiding the locking element.

* * * * *